US012794833B2

(12) United States Patent
Wong et al.

(10) Patent No.: US 12,794,833 B2
(45) Date of Patent: Nov. 10, 2026

(54) OPTIMIZATION OF FLOW-CONTROL BUFFER ALLOCATION ON OPTICAL INTERCONNECTS

(71) Applicant: Hewlett Packard Enterprise Development LP, Spring, TX (US)

(72) Inventors: Sheau Shian Wong, Singapore (SG); Roy Guoqiang Wang, Singapore (SG); Christopher, Singapore (SG); Yi Zhi Wee, Singapore (SG)

(73) Assignee: Hewlett Packard Enterprise Development LP, Spring, TX (US)

( * ) Notice: Subject to any disclaimer, the term of this patent is extended or adjusted under 35 U.S.C. 154(b) by 260 days.

(21) Appl. No.: 18/903,700

(22) Filed: Oct. 1, 2024

(65) Prior Publication Data

US 2026/0095421 A1 Apr. 2, 2026

(51) Int. Cl.
*H04L 49/9005* (2022.01)
*H04B 17/10* (2015.01)

(52) U.S. Cl.
CPC ....... *H04L 49/9005* (2013.01); *H04B 17/102* (2015.01)

(58) Field of Classification Search
CPC ... H04L 49/9005; H04L 47/30; H04B 17/102; Y02D 30/00
See application file for complete search history.

(56) References Cited

U.S. PATENT DOCUMENTS

2024/0250912 A1 * 7/2024 Ghanwani ............... H04L 43/16

FOREIGN PATENT DOCUMENTS

CN 116436521 A * 7/2023 ......... H04B 10/0795

OTHER PUBLICATIONS 802.1Qbb—Priority-based Flow Control, available online at <https://grouper.ieee.org/groups/802/1/pages/802.1bb.html>, Sep. 15, 2011, 3 pages.
IEEE Computer Society, "IEEE Standard for Local and Metropolitan Area Networks—Bridges and Bridged Networks", IEEE Std 802.1Q™-2018 (Revision of IEEE Std 802.1Q-2014), Annex N, 11 pages.
Rich Seifert, "IEEE 802.3x and Asymmetrical Flow Control", available online at <https://www.ieee802.org/3/z/public/presentations/nov1996/RS8023x.pdf>, Nov. 1996, 11 pages.

* cited by examiner

*Primary Examiner* — Ayanah S George
(74) *Attorney, Agent, or Firm* — Yao Legal Services, Inc.

(57) ABSTRACT

One aspect of the instant application provides a system and method for allocating headroom buffers. During operation, the system may obtain, at a local node of an optical link, a local transmitter power measurement and a local receiver power measurement and receive, from a remote node of the optical link, a remote transmitter power measurement and a remote receiver power measurement. The system may generate a first length estimation of the optical link based on the local transmitter power measurement and the remote receiver power measurement and then allocate, for the local node, a local headroom buffer based on the first length estimation of the optical link.

20 Claims, 6 Drawing Sheets

100

100

OPTIMIZATION OF FLOW-CONTROL BUFFER ALLOCATION ON OPTICAL INTERCONNECTS

BACKGROUND

Field

This disclosure is generally related to flow control in optical interconnects. More specifically, this disclosure is related to the allocation of headroom buffers used for flow control purposes.

BRIEF DESCRIPTION OF THE FIGURES

In the figures, like reference numerals refer to the same figure elements.

DETAILED DESCRIPTION

Figure 1:
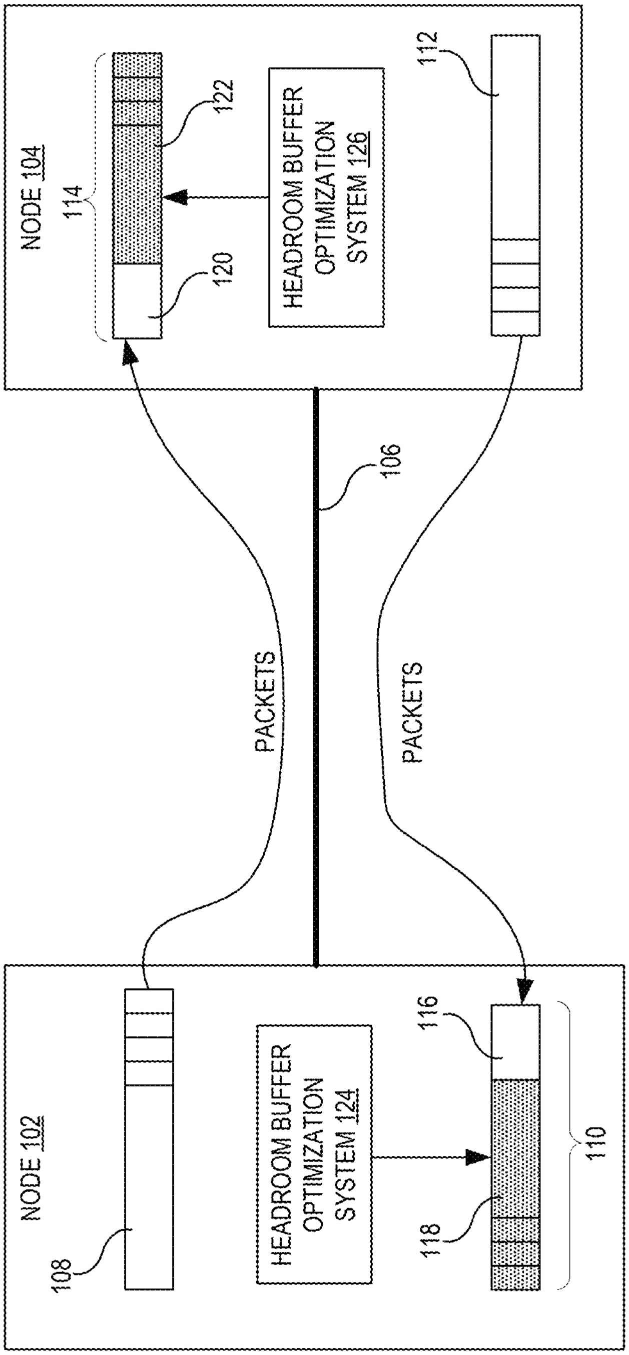
FIG. 1 illustrates an example network environment implementing headroom buffer optimization, according to one aspect of the instant application.

Flow control is essential in ensuring efficient and reliable data transfer across a network. It typically involves managing the rate at which data packets are sent between network devices to prevent congestion, avoid packet loss, and maintain optimal performance. Flow control has been used to balance the data transmission rate with the network's capacity, ensuring that no single node overwhelms the system.

Among the various flow-control mechanisms, Link-Level Flow Control (LLFC) is used to manage the flow of data across a single network link, ensuring that the sender does not overwhelm the receiver by sending data faster than it can be processed, preventing buffer overflow and data loss at the receiving end. In Ethernet networks implementing the LLFC, a receiver can send a "pause" frame to the sender to temporarily stop data transmission. Similarly, Priority-based Flow Control (PFC) can provide finer-grained control over network traffic by enabling the network to pause specific types of traffic while allowing other high-priority traffic to continue flowing. Both flow-control techniques rely on buffers (e.g., large blocks of memory that store packets until they are processed) to prevent packet loss in the event of congestion. For example, when congestion happens downstream, a switch may not be able to process and transmit all packets at the time they arrive and will need to store them in its buffer. Optimal allocation of the buffers plays an important role in ensuring optimal network performance. Under-allocating buffers may cause packet loss, whereas over-allocating buffers may result in a waste of memory resources.

With LLFC or PFC, a receiver node may store incoming packets in its buffer before processing and send a "pause" frame to its link partner when the buffer utilization reaches a predetermined threshold to ensure that the receiver node does not run out of buffer space. However, it may take time for the link partner to receive the "pause" frame and stop packet transmission, meaning that there are a number of packets that are already in flight traveling through the physical medium (e.g., copper wires or optical fibers). These in-flight packets would reach the receiver after the receiver sends the "pause" frame. Therefore, the aforementioned buffer needs the have a sufficiently large headroom to ensure that those in-flight packets will not cause buffer overflow.

Network devices implementing LLFC or PFC may maintain a large buffer for storing incoming packets. This large buffer may be referred to as a common buffer and has a fixed size. The size of the common buffer is determined by the device vendor at the manufacturing stage. The common buffer may be configured (e.g., by the user) into two different buffers, including a headroom buffer for absorbing the in-flight packets and an ingress buffer containing the remaining space of the common buffer. Before the receiver nodes send the "pause" frame, incoming packets may be stored in the ingress buffer, and incoming packets received after the "pause" frame may be stored in the headroom buffer.

The size of the headroom buffer is sensitive to the cable length of the network link. For example, a longer cable means more in-flight packets, thus requiring a larger headroom buffer. If the headroom buffer is under-allocated, it may not be able to absorb all in-flight packets, which may lead to packet loss. Conventional approaches tend to over allocate the headroom buffer (e.g., considering the worst-case scenario). However, such approaches may result in a smaller ingress buffer, which may reduce the network device's ability to handle burst traffic.

Note that larger ingress buffers may allow network devices to absorb large bursts of traffic as it can accommodate more incoming packets. For the same traffic pattern, a device with a larger ingress buffer does not need to request its link partner to pause transmission, whereas a device with a smaller ingress buffer may need to do so. Pausing packet transmission would increase packet backpressure (i.e., buildup of data packets at a network node due to buffer saturation) all the way to the source (which may result in packet loss when buffer space in upstream nodes is insufficient) and increase latency. Reducing the frequency of the pauses (or eliminating the pauses) can improve network performance (e.g., increase throughput and reduce latency). Therefore, it is important to optimize the size of the headroom buffer such that it is sufficiently large to absorb in-flight packets but does not unnecessarily reduce the size of the ingress buffer. An unnecessarily large headroom buffer also wastes buffer resources. More specifically, in situations where there is a common buffer shared among all interfaces of a network node, overallocation of the headroom buffer on one interface prevents optimal buffer allocation on other interfaces. According to some aspects of the instant application, the headroom buffer on a pair of network devices may be optimally configured based on the actual length of the cable connecting the network devices.

FIG. 1 illustrates an example network environment implementing headroom buffer optimization, according to one aspect of the instant application. In FIG. 1, network 100 may include a node 102, a node 104, and a link 106 connecting nodes 102 and 104.

Each node may include one or more computing devices, which may be a server, a cluster of servers, a storage array, a computer appliance, a workstation, a desktop computer, a laptop computer, a switch, a router, or any other processing device or equipment including a processing resource. In one example, a node may include a processing resource communicatively coupled to at least one non-transitory computer-readable storage medium that stores instructions that, when executed by the processing resource, cause the node to undertake certain actions and functionalities as described herein. Link 106 may include any wireless or wired links that connect nodes 102 and 104. In one example, network 100 may be part of a datacenter network, nodes 102 and 104 may be datacenter servers, and link 106 may include an optical cable.

Each node may include a transmit buffer for buffering to-be-transmitted packets and a receiver buffer for buffering received packets. For example, node 102 includes a transmit buffer 108 and a receiver buffer 110, and node 104 includes a transmit buffer 112 and a receiver buffer 114.

Each receiver buffer may be configured into a headroom buffer for absorbing in-flight packets and an ingress buffer for absorbing burst traffic. In the example shown in FIG. 1, receiver buffer 110 includes a headroom buffer 116 and an ingress buffer 118, and receiver buffer 114 includes a headroom buffer 120 and an ingress buffer 122.

As discussed previously, it is important to optimize the headroom buffer to prevent packet loss without wasting buffer resources and jeopardizing the network performance. In the example shown in FIG. 1, each node may include a headroom buffer optimization system that may optimize the size of the headroom buffer. For example, node 102 includes a headroom buffer optimization system 124 that may set headroom buffer 116 to an optimal size, and node 104 includes a headroom buffer optimization system 126 that may set headroom buffer 120 to its optimal size. The optimal size of the headroom buffer depends on the time delay between the time a node invokes a pause and the time the node no longer receives packets from its link partner.

According to the IEEE Standard 802.1Q-2018, there are various sources of time delays, including processing and queuing delay of the pause request, propagation delay of the pause frame (e.g., propagation delay on link 106), response time at the link partner, and propagation delay of the in-flight packets. The total delay value (DV) may be computed according to:

$$DV = 2\times(\mathrm{Max}Frame) + (PauseFrame) + TXD_{s1} + RXd_{s2} + HD_{s2} + TXd_{s2} + RXd_{s1} + 2\times(\text{Cable Delay}),$$

where the first two terms account for the size of the frames (MaxFrame denotes the maximum frame size, and PauseFrame denotes the size of the pause frame), the next five terms account for the internal processing delay ($TXd_{s1}$ and $RXd_{s1}$ denote the transmitter and receiver interface delay at node 102, respectively; $TXd_{s2}$ and $RXd_{s2}$ denote the transmitter and receiver interface delay at node 104, respectively; and $HD_{s2}$ denotes the higher layer delay at node 104), and the last term accounts for the propagation delay over the transmission medium (e.g., the optical cable). The delays related to the frame size and the internal processing are known fixed delays, whereas the cable delay depends on the cable length and may be computed according to:

$$\text{Cable Delay} = \text{Medium Length}\times\frac{1}{BT\times v},$$

where v is the signals propagation speed and BT is the bit time of the medium. The number of bytes in the headroom buffer may be computed according to: HRBuffer=DV/8 (byte). Optimizing the headroom buffer requires an accurate estimation of the cable length.

Many device vendors may implement a set of default buffer settings to cover common use cases, which may be optimized for short cable ranges (e.g., less than 500 m). To optimize the network performance and eliminate packet loss, network administrators may wish to tweak these settings based on the actual operating environment of the links. This is critical in the datacenter environment wherein the optical cable length can range from a few hundred meters (e.g., 300 m) to tens of kilometers (e.g., 100 km), whereas the default settings can only cover a subset of the possible cable lengths.

Conventional approaches for estimating the length of an optical cable may require complex optical testers, such as an Optical Time-Domain Reflectometer (OTDR). Such approaches can be labor intensive, and it may be difficult to set up the test equipment correctly. To overcome such difficulties, according to some aspects of the instant application, an accurate estimation of the cable length may be obtained based on the transmitting and receiving optical power detected at the transmitter and receiver, respectively, without relying on complex equipment. More specifically, when optical signals propagate in the optical cable connecting the link partners, some of the optical power may be lost due to absorption and scattering. More specifically, assuming a constant loss coefficient α, the relationship between the transmitting power $P_{tx}$ and the receiving power $P_{rx}$ can be expressed as: $P_{rx}=P_{tx}\cdot e^{-\alpha L}$, where L is the cable length. Therefore, given α, $P_{tx}$, and $P_{rx}$, one may estimate the length of the optical cable.

According to some aspects of the instant application, the optical transceiver on a network device may support Digital Optical Monitoring (DOM), meaning that the transmitting (TX) and receiving (RX) power at the transceiver may be read in real-time (e.g., via a digital interface on the transceiver). Examples of the optical transceivers may include but are not limited to small form-factor pluggable (SFP) transceivers, enhanced small form-factor pluggable (SFP+), quad small form-factor pluggable (QSFP) transceivers, double density QSFP (QSFP-DD) transceivers, MicroQSFP, 10 Gigabit Small Form Factor Pluggable (XFP) transceivers, C form-factor pluggable (CFP), XENPAK transceivers, etc. In some examples, the digital interface for reading the TX/RX powers may include an Inter-Integrated Circuit ($I^2C$) interface. Note that each network device can only obtain its own TX power and RX power via the DOM. To estimate the cable length, each network device should have knowledge of the TX or RX power of its link partner. According to some aspects, link partners may exchange power information during the link negotiation. According to some aspects, link partners may use LLDP (Link Layer Discovery Protocol) to exchange power information. Alternatively, CDP (Cisco Discovery Protocol) may also be used for power information exchange.

Once a local device or node obtains the TX/RX power information from its link partner (referred to as the remote device or node), the local node may estimate the cable length of the link based on the difference between the local TX power and the remote RX power, the difference between the local TX power and the remote RX power, or both. The remote node may also similarly estimate the cable length. Each node may further compute the optimal size of the headroom buffer based on the estimated cable length.

According to some aspects, a user (e.g., the network administrator) may manually configure the headroom buffer based on the computed optimal size (e.g., by sending a configuration command via a device-management user interface). In some examples, sending the configuration command may involve the user updating the buffer settings stored in the configuration database.

According to further aspects, the headroom buffer may be automatically configured. For example, before deploying the network device, the user may enable the auto-buffer-configuration feature on one or more interfaces of the network device. This way, once the device is deployed in the field (e.g., its interfaces are connected to their partners), a headroom buffer allocation system on the network device may automatically configure the headroom buffer for each enabled interface by obtaining optical power information, estimating the cable length, computing the optimal headroom buffer size, and setting the headroom buffer to the optimal size. More specifically, setting the size of the headroom buffer may include setting the values of one or more control and status registers (CSRs), e.g., the buffer-size CSRs.

Figure 2:
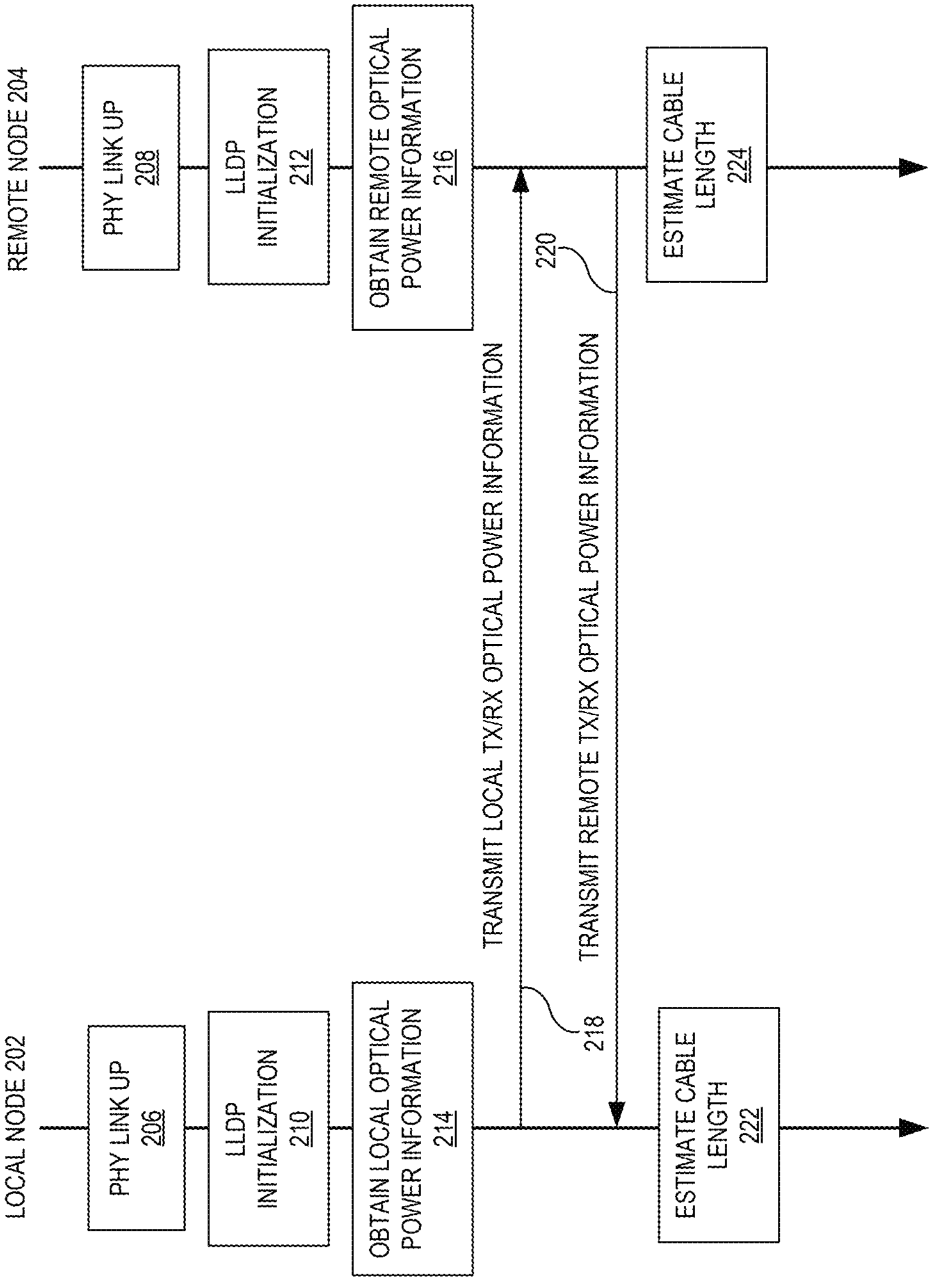
FIG. 2 illustrates an example time-space diagram for a cable-length estimation process, according to one aspect of the instant application.

FIG. 2 illustrates an example time-space diagram for a cable-length estimation process, according to one aspect of the instant application. During operation, a local node 202 and a remote node 204 may each perform the standard physical (PHY) link-up procedure (operations 206 and 208), which may include connecting the cable, detecting signals from each other, performing auto-negotiation to determine the operating parameters (e.g., speed and duplex mode), and synchronizing the timing to establish a stable communication channel. After the PHY link is up, the optical transceivers on each node are ready to transmit and receive data. The terms "local" and "remote" are relative terms. For a pair of link partners connected via an optical cable, one node may be considered a local node, and the other may be considered a remote node, and vice versa. Both nodes may have similar structures and functionalities.

In this example, local node 202 and remote node 204 implement LLDP to discover each other and exchange device information. Subsequent to PHY link up, each node may perform the LLDP initialization process (operations 210 and 212). During LLDP initialization, each node needs to enable LLDP globally and set various LLDP parameters (e.g., the transmission interval, the initialization delay, etc.). Each node may also determine the Type-Length-Value (TLV) elements included in its LLDP advertisements. After the LLDP initialization, each node is ready to send LLDP advertisements.

Local node 202 may obtain local optical power information (operation 214), and remote node 204 may obtain remote optical power information (operation 216). According to some aspects, each node may include one or more optical interfaces (e.g., transceivers) that support DOM. According to further aspects, each transceiver may include an $I^2C$ interface, and the TX/RX power information may be accessed (e.g., by software) via the $I^2C$ interface.

Local node 202 may transmit the local TX/RX optical power information to remote node 204 (operation 218), and remote node 204 may transmit the remote optical TX/RX power information to local node 202 (operation 220). According to some aspects, the TX/RX optical power information may be included in the LLDP advertisement messages transmitted by each node. A typical LLDP advertisement data unit may include a series of TLV elements that provide information about the device and its capabilities, such as system name and description, port ID and description, device capabilities, management Internet protocol (IP) address, virtual network information, and physical layer configuration information. In some aspects, each node may send an LLDP data unit with a TLV element containing both the TX and RX optical power information.

Each node may then estimate the length of the optical cable connecting local node 202 and remote node 204 (operations 222 and 224). According to some aspects, each node may determine the optical attenuation coefficient of the optical cable based on the type of fiber and the signal wavelength and estimate the length of the optical cable based on the optical attenuation coefficient and the difference between the local TX power and the remote RX power (or the difference between the local RX power and the remote TX power, or both). In one example, local node 202 may estimate the length of the optical cable by generating a first length estimation based on the difference between the local TX power and the remote RX power and a second length estimation based on the difference between the local RX power and the remote TX power, and then averaging the two length estimations. In another example, while estimating the length of the optical cable, local node 202 may compare the first and second length estimations and select the larger one to ensure sufficient size of the headroom buffer. If the first and second length estimations are the same, local node 202 may select either one. In yet another example, local node 202 may compute the difference between the first and second length estimations to identify possible faults in the optical cable connecting local node 202 and remote node 204. More specifically, if local node 202 determines that the ratio between the difference and the first or second length estimation is greater than a predetermined threshold (e.g., 10% or 20%), it may indicate to the network administrator (e.g., via a warning message) that the optical cable is asymmetric and possibly faulty. Remote node 204 may estimate the cable length (e.g., generating the first and second length estimations) similarly.

Figure 3:
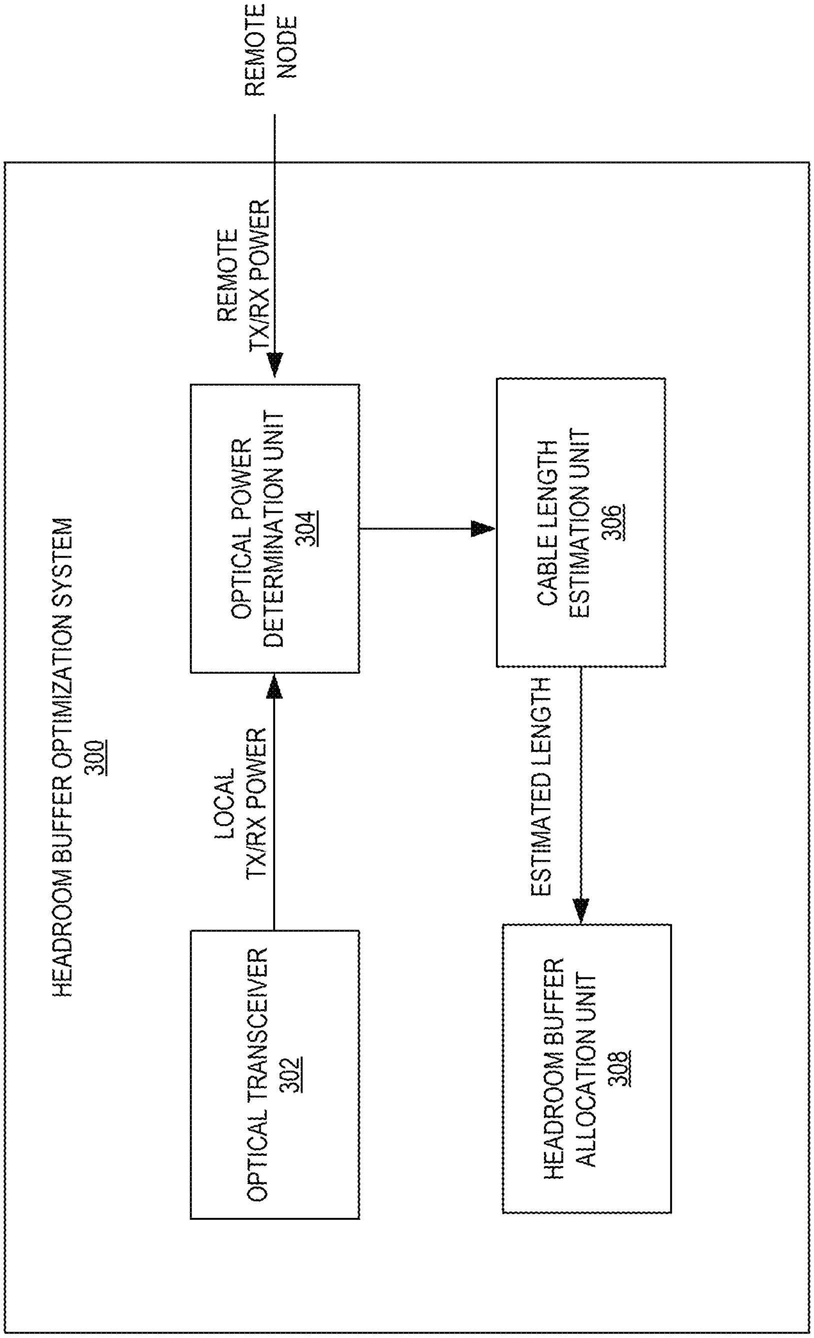
FIG. 3 illustrates an example block diagram of a headroom buffer optimization system, according to one aspect of the instant application.

FIG. 3 illustrates an example block diagram of a headroom buffer optimization system, according to one aspect of the instant application. Headroom buffer optimization system 300 may include an optical transceiver 302, an optical power determination unit 304, a cable length estimation unit 306, and a headroom buffer allocation unit 308. The various units in headroom buffer optimization system 300 may be implemented using hardware components, software components, or a combination thereof.

Optical transceiver 302 can include a transmitter and a receiver and is responsible for sending optical signals to and receiving optical signals from a remote node. According to some aspects of the instant application, optical transceiver 302 supports DOM functionalities. In some examples, optical transceiver 302 may include an $I^2C$ interface.

Optical power determination unit 304 is responsible for determining optical power measurements, including the local TX/RX optical power measurements and the remote TX/RX optical power measurements. More specifically, optical power determination unit 304 may obtain readings of the local TX/RX power from the $I^2C$ interface on optical transceiver 302. Optical power determination unit 304 may receive LLDP advertisement messages from the remote node, the messages carrying the remote TX/RX optical power measurements.

Cable length estimation unit 306 is responsible for estimating the length of the optical cable connecting the local and remote nodes. According to some aspects, cable length estimation unit 306 may estimate the length based on the optical attenuation coefficient and the difference between the local TX power and the remote RX power (or the difference between the local RX power and the remote TX power, or both). For example, cable length estimation unit 306 may first determine the attenuation coefficient α based on the type of the optical cable and the wavelength of the optical signals and then estimate the length according to $$L = \frac{1}{\alpha}\ln(P_{tx\_local}/P_{rx\_remote}),$$

where $P_{tx\_local}$ is the local TX optical power, and $P_{rx\_remote}$ is the remote RX optical power. In a further example, cable length estimation unit 306 may generate a first length estimation $L_1$ according to $$L_1 = \frac{1}{\alpha}\ln(P_{tx\_local}/P_{rx\_remote}),$$

a second length estimation $L_2$ according to $$L_2 = \frac{1}{\alpha}\ln(P_{tx\_remote}/P_{rx\_local}),$$

and then average the two length estimations to obtain the estimated length L, $L=(L_1+L_2)/2$. In another example, the estimated length L may be computed as $L=\max(L_1, L_2)$.

Headroom buffer allocation unit 308 is responsible for allocating the headroom buffer based on the estimated cable length. As discussed previously, the optimal size of the headroom buffer is determined based on the total delay DV. Headroom buffer allocation unit 308 may first compute the delay caused by the cable length and then add the cable delay to other fixed delay values to obtain the total delay. The optimal size of the headroom buffer in bytes may be determined by DV/8. Once the optimal size of the headroom buffer is determined, headroom buffer allocation unit 308 may send a configuration signal to hardware (e.g., the switch ASIC) to allocate an appropriate portion of the common buffer as the headroom buffer. In some examples, headroom buffer allocation unit 308 may set the values of one or more CSRs. In alternative examples, headroom buffer allocation unit 308 may receive a command from a user via a user interface and then update the buffer setting in the configuration database in the network device.

Figure 4:
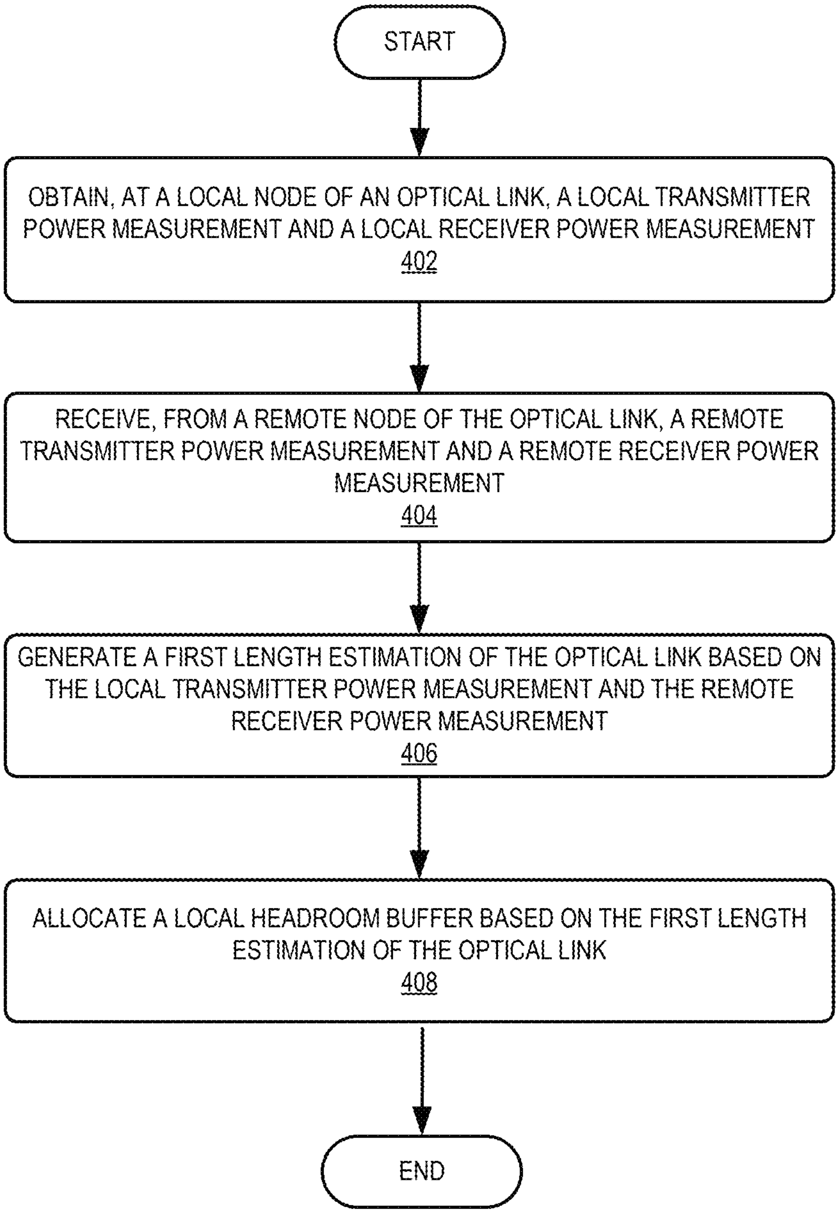
FIG. 4 presents a flowchart illustrating an example process for allocating a headroom buffer, according to one aspect of the instant application.

FIG. 4 presents a flowchart illustrating an example process for allocating a headroom buffer, according to one aspect of the instant application. The method may be performed by a headroom buffer optimization system (which is similar to headroom buffer optimization system shown in FIG. 3). Although the example process in FIG. 4 shows a specific order of performing certain operations, the process is not limited to such an order. Operations shown in succession in the flowchart may be performed in a different order and may be executed concurrently or with partial concurrence or combinations thereof.

During operation, the headroom buffer optimization system residing on a local node of an optical link may obtain the local transmitter power measurement and the local receiver power measurement (operation 402). The optical link couples the local node with a remote node, both nodes implementing LLFC or PFC, thus requiring the configuration of a headroom buffer to absorb in-flight packets once the pause is invoked. The local or remote node transmits and receives optical signals via an optical transceiver, which supports DOM. The local node may obtain real-time local power readings (including TX and RX power measurements) via an $I^2C$ interface on the optical transceiver. Similarly, the remote node may obtain real-time remote power readings.

The system may receive from the remote node of the optical link, the remote transmitter power measurement and the remote receiver power measurement (operation 404). According to some aspects, the local and remote nodes may use LLDP for link negotiation, and the LLDP advertisement messages transmitted by each node may include optical power information. For example, the LLDP advertisement received by the local node from the remote node may include the remote transmitter power measurement and the remote receiver power measurement, and the LLDP advertisement sent by the local node to the remote node may include the local transmitter power measurement and the local receiver power measurement.

The system may generate a first length estimation of the optical link based on the local transmitter power measurement and the remote receiver power measurement (operation 404). More specifically, the system may compute $$L_1 = \frac{1}{\alpha}\ln(P_{tx\_local}/P_{rx\_remote}),$$

where α is the optical attenuation coefficient of the optical cable. The remote node may similarly compute the first length estimation.

The system may then allocate the local headroom buffer based on the first length estimation of the optical link (operation 406). The optimal size of the headroom buffer should be determined based on the total delay, which includes both the cable delay and various fixed delays. The system may first compute the total delay DV (e.g., by adding the cable delay to other fixed delays) and then determine the optimal size of the headroom buffer based on DV. The system may allocate an appropriate amount of buffer space from the common buffer (e.g., common buffer 110 shown in FIG. 1) to the headroom buffer (e.g., headroom buffer 116 shown in FIG. 1). To allocate the headroom buffer, the system may update the values of a set of CSRs. The remote node may similarly allocate a remote headroom buffer.

Figure 5:
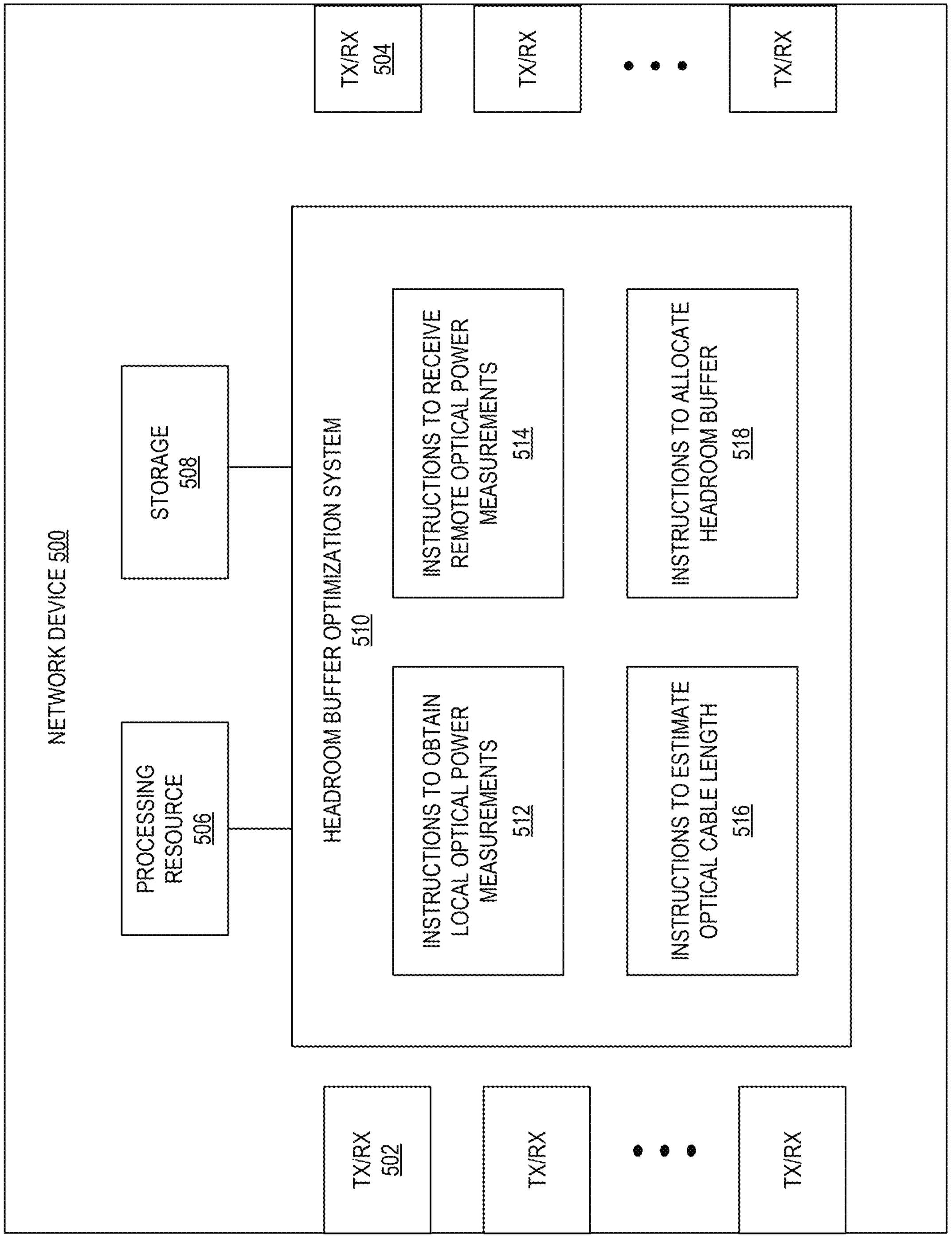
FIG. 5 illustrates an example block diagram of a network device, according to one aspect of the instant application.

FIG. 5 illustrates an example block diagram of a network device, according to one aspect of the instant application. Network device 500 may include any physical devices that allow hardware on a computer network to communicate and interact with one another. Examples of network device 500 may include a switch, a router, a gateway, an access point, a network interface card (NIC), etc. In FIG. 5, network device 500 may include a number of optical transceivers, such as transceivers 502 and 504, for communicating with peer network devices. Network device 500 may be implemented either as a local node or a remote node shown in FIGS. 1 and 2.

Network device 500 may include one or more processing resources (e.g., processing resource 506), one or more storage devices (e.g., storage device 508), and a headroom buffer optimization system 510. Network device 500 may include fewer or more entities than those shown in FIG. 5.

In the examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a computer-readable storage medium, or a combination thereof. In the examples described herein, the processing resource may fetch, decode, and execute instructions stored on a storage medium to perform the functionalities described in relation to the instructions stored on the computer-readable medium. In other examples, the functionalities described in relation to any instructions described herein may be implemented in the form of electronic circuitry, in the form of executable instructions encoded on a computer-readable medium, or a combination thereof. The computer-readable storage medium may be located either in the computing device executing the instructions, or remote from but accessible to the computing device (e.g., via a computer network) for execution. In the examples illustrated herein, the node may be implemented by one computer-readable storage medium or multiple computer-readable storage media.

Headroom buffer optimization system 510 may include any number of software units, hardware units, and firmware units that work together to achieve the goal of optimizing the allocation of headroom buffers in network device 500. According to some aspects, headroom buffer optimization system 510 may include instructions, which when executed by processing resource 506 may cause processing resource 506 to perform methods and/or processes described in this disclosure. Specifically, headroom buffer optimization system 510 may include instructions 512 to obtain the local optical power measurements, as described above in relation to operation 402 shown in FIG. 4. According to some aspects, determining the local optical power measurements may include accessing the optical transceiver from an $I^2C$ interface to read the local optical TX and RX. Instructions 512 may be used to obtain the local optical power measurement for multiple optical interfaces.

Headroom buffer optimization system 510 may include instructions 514 to receive remote optical power measurements, as described above in relation to operation 404 shown in FIG. 4. According to some aspects, receiving the remote optical power measurements may include receiving an LLDP message from the link partner of a particular optical interface. According to further aspects, the LLDP message may include the remote optical TX and RX power measurements.

Headroom buffer optimization system 510 may include instructions 516 to estimate the optical cable length, as described above in relation to operation 406 shown in FIG. 4. According to some aspects, the optical cable length may be estimated based on the difference between the local RX power measurement and the remote TX power measurement, the difference between the local TX power measurement and the remote RX power measurement, or both. The optical attenuation coefficient may also need to be considered when estimating the optical cable length. In some examples, the optical attenuation coefficient may be determined based on the fiber type and the signal wavelength. When the different interfaces are connected to different remote nodes, instructions 516 may be used to estimate the optical cable length for each link.

Headroom buffer optimization system 510 may include instructions 518 to allocate the headroom buffer, as described above in relation to operation 408 shown in FIG. 4. According to some aspects, instructions 518 may automatically allocate the headroom buffer by communicating with the memory on the application-specific integrated circuit (ASIC) of network device 500. According to alternative aspects, instructions 518 may update the buffer settings in the device's configuration database based on a configuration command received from a user via a user interface.

Figure 6:
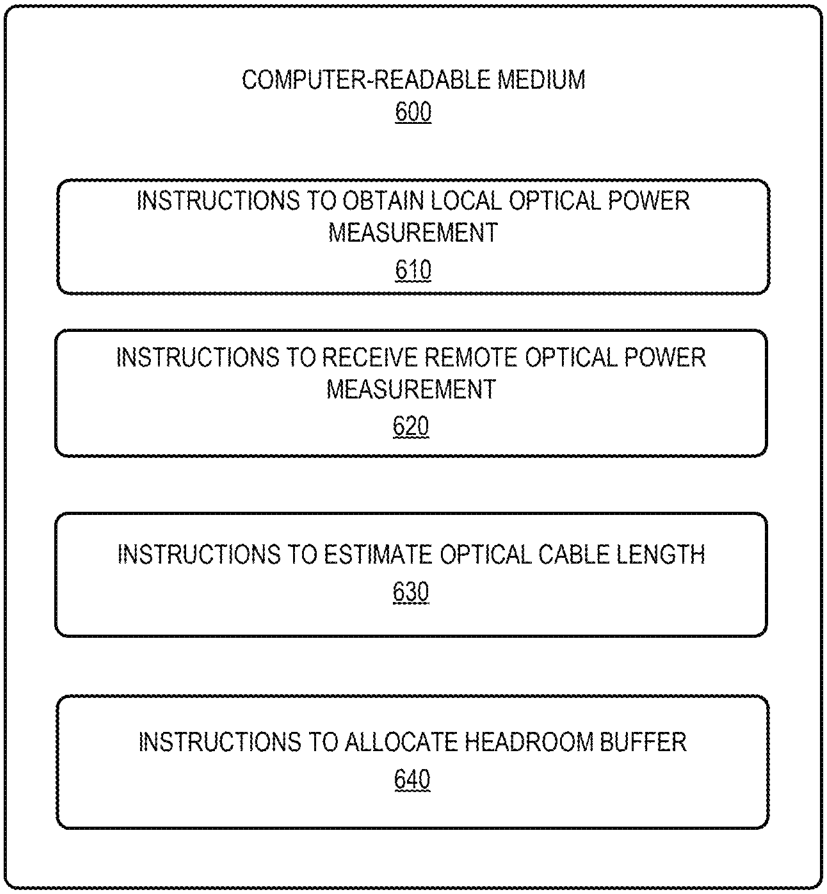
FIG. 6 illustrates a computer-readable medium that facilitates the allocation of the headroom buffer, according to one aspect of the instant application.

FIG. 6 illustrates a computer-readable medium that facilitates the allocation of the headroom buffer, according to one aspect of the instant application. CRM 600 may be a non-transitory computer-readable medium or device storing instructions that when executed by a computer or processing resource cause the computer or processing resource to perform a method. As used herein, a "computer-readable storage medium" may be any electronic, magnetic, optical, or other physical storage apparatus to contain or store information such as executable instructions, data, and the like. For example, any computer-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer-readable storage medium described herein may be non-transitory.

CRM 600 may store instructions 610 to obtain the local optical power measurements, as described above in relation to operation 402 shown in FIG. 4; instructions 620 to receive remote optical power measurements, as described above in relation to operation 404 shown in FIG. 4; instructions 630 to estimate the optical cable length, as described above in relation to operation 406 shown in FIG. 4; and instructions 640 to allocate the headroom buffer, as described above in relation to operation 408 shown in FIG. 4. CRM 600 may include more instructions than those shown in FIG. 6.

In general, the disclosed aspects provide mechanisms to optimize the allocation of the headroom buffer in network devices implementing LLFC or PFC. Optical transceiver modules typically support DOM to allow each device to obtain its own TX and RX optical power measurement. By exchanging the TX and RX powers, link partners may determine the amount of power loss on the link, which may then be used to estimate the length of the optical cable based on the attenuation coefficient and the power loss. The length information may be used to compute the optimal size of the headroom buffer.

One aspect of the instant application provides a system and method for allocating headroom buffers. During operation, the system may obtain, at a local node of an optical link, a local transmitter power measurement and a local receiver power measurement and receive, from a remote node of the optical link, a remote transmitter power measurement and a remote receiver power measurement. The system may generate a first length estimation of the optical link based on the local transmitter power measurement and the remote receiver power measurement and then allocate, for the local node, a local headroom buffer based on the first length estimation of the optical link.

In a variation on this aspect, the system may generate a second length estimation of the optical link based on the local receiver power measurement and the remote transmitter power measurement. The system may further compute an average length estimation of the optical link by averaging the first and second length estimations or select a longer length estimation between the first and second length estimations. The local headroom buffer may be allocated based on the average length estimation or the longer length estimation.

In a variation on this aspect, the system may transmit, to the remote node of the optical link, the local transmitter power measurement and the local receiver power measurement to allow the remote node to allocate a remote headroom buffer.

In a variation on this aspect, receiving the remote transmitter power measurement and the remote receiver power measurement may include receiving from the remote node Link Layer Discovery Protocol (LLDP) advertisement messages.

In a variation on this aspect, the local node and remote node each may include an optical transceiver with Digital Optical Monitoring (DOM) capability.

In a further variation, determining the local transmitter power measurement and the local receiver power measurement may include accessing the optical transceiver via an Inter-Integrated Circuit ($I^2C$) bus.

In a variation on this aspect, allocating the local headroom buffer may include receiving, via a user interface, a configuration command.

In a variation on this aspect, allocating the local headroom buffer may include setting a set of control and status registers (CSRs) in the local node.

In a variation on this aspect, generating the first length estimation may include determining an attenuation coefficient associated with the optical link, and generating the first length estimation based on the attenuation coefficient and a difference between the local transmitter power measurement and the remote receiver power measurement.

One aspect of the instant application provides a network device. The network device may include an optical transceiver with Digital Optical Monitoring (DOM) capability to transmit and receive optical signals, the optical transceiver coupled to a remote optical transceiver on a remote network device via an optical link. The network device may further include at least one processing resource and at least one non-transitory machine-readable storage medium comprising instructions executable by the processing resource to: obtain a local transmitter power measurement and a local receiver power measurement; receive, from a remote network device, a remote transmitter power measurement and a remote receiver power measurement; generate a first length estimation of the optical link based on the local transmitter power measurement and the remote receiver power measurement; and allocate a local headroom buffer based on the first length estimation of the optical link.

The foregoing description is presented to enable any person skilled in the art to make and use the aspects and examples and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A method comprising:

obtaining, by a local node of an optical link, a local transmitter power measurement and a local receiver power measurement;

receiving, from a remote node of the optical link, a remote transmitter power measurement and a remote receiver power measurement;

generating, by the local node, a first length estimation of the optical link based on the local transmitter power measurement and the remote receiver power measurement; and allocating, by the local node, a local headroom buffer based on the first length estimation of the optical link.

2. The method of claim 1, further comprising:

generating, by the local node, a second length estimation of the optical link based on the local receiver power measurement and the remote transmitter power measurement; and computing, by the local node, an average length estimation of the optical link by averaging the first and second length estimations or selecting a longer length estimation between the first and second length estimations;

wherein the local headroom buffer is allocated based on the average length or the longer length estimation.

3. The method of claim 1, further comprising:

transmitting, to the remote node of the optical link, the local transmitter power measurement and the local receiver power measurement to allow the remote node to allocate a remote headroom buffer.

4. The method of claim 1, wherein receiving the remote transmitter power measurement and the remote receiver power measurement comprises receiving from the remote node Link Layer Discovery Protocol (LLDP) advertisement messages.

5. The method of claim 1, wherein the local node and remote node each comprise an optical transceiver with Digital Optical Monitoring (DOM) capability.

6. The method of claim 5, wherein obtaining the local transmitter power measurement and the local receiver power measurement comprises accessing the optical transceiver via an Inter-Integrated Circuit ($I^2C$) bus.

7. The method of claim 1, wherein allocating the local headroom buffer comprises receiving, via a user interface, a configuration command.

8. The method of claim 1, wherein allocating the local headroom buffer comprises setting a set of control and status registers (CSRs) in the local node.

9. The method of claim 1, wherein generating the first length estimation comprises:

determining an attenuation coefficient associated with the optical link; and generating the first length estimation based on the attenuation coefficient and a difference between the local transmitter power measurement and the remote receiver power measurement.

10. A network device, comprising:

an optical transceiver with Digital Optical Monitoring (DOM) capability to transmit and receive optical signals, the optical transceiver coupled to a remote optical transceiver on a remote network device via an optical link;

at least one processing resource; and at least one non-transitory machine-readable storage medium comprising instructions executable by the processing resource to:

obtain a local transmitter power measurement and a local receiver power measurement of the optical transceiver;

receive, from the remote network device, a remote transmitter power measurement and a remote receiver power measurement of the remote optical transceiver;

generate a first length estimation of the optical link based on the local transmitter power measurement and the remote receiver power measurement; and allocate a local headroom buffer based on the first length estimation of the optical link.

11. The network device of claim 10, wherein the instructions comprise instructions executable to:

generate a second length estimation of the optical link based on the local receiver power measurement and the remote transmitter power measurement; and compute an average length estimation of the optical link by averaging the first and second length estimations or selecting a longer length estimation between the first and second length estimations;

wherein the local headroom buffer is allocated based on the average length estimation or the longer length estimation.

12. The network device of claim 10, wherein the instructions comprise instructions executable to:

transmit, to the remote network device, the local transmitter power measurement and the local receiver power measurement to allow the remote network device to allocate a remote headroom buffer.

13. The network device of claim 10, wherein receiving the remote transmitter power measurement and the remote receiver power measurement comprises receiving from the remote network device Link Layer Discovery Protocol (LLDP) advertisement messages.

14. The network device of claim 10, wherein the optical transceiver supports Digital Optical Monitoring (DOM), and wherein obtaining the local transmitter power measurement and the local receiver power measurement comprise instructions to access the optical transceiver via an Inter-Integrated Circuit ($I^2C$) bus.

15. The network device of claim 10, wherein the instructions to allocate the local headroom buffer comprise instructions to:

receive, via a user interface, a configuration command; or set a set of control and status registers (CSRs) in the local node.

16. The network device of claim 10, wherein the instructions to generate the first length estimation comprise instructions to:

determine an attenuation coefficient associated with the optical link; and generate the first length estimation based on the attenuation coefficient and a difference between the local transmitter power measurement and the remote receiver power measurement.

17. A non-transitory computer-readable storage medium storing instructions executable to cause a node of an optical link to:

obtain a local transmitter power measurement and a local receiver power measurement;

receive, from a remote node of the optical link, a remote transmitter power measurement and a remote receiver power measurement;

generate a first length estimation of the optical link based on the local transmitter power measurement and the remote receiver power measurement; and allocate a local headroom buffer based on the first length estimation of the optical link.

18. The non-transitory computer-readable storage medium of claim 15, wherein the instructions to receive the remote transmitter power measurement and the remote receiver power measurement comprise instructions to receive from the remote node Link Layer Discovery Protocol (LLDP) advertisement messages.

19. The non-transitory computer-readable storage medium of claim 15, wherein the node comprises an optical transceiver with Digital Optical Monitoring (DOM) capability, and wherein the instructions to obtain the local transmitter power measurement and the local receiver power measurement comprise instructions to access the optical transceiver via an Inter-Integrated Circuit ($I^2C$) bus.

20. The non-transitory computer-readable storage medium of claim 15, wherein the instructions to allocate the local headroom buffer comprise instructions to:

receive, via a user interface, a configuration command; or set a set of configuration registers in the local node.

* * * * *